United States Patent [19]

Zalucha et al.

[11] 4,409,383

[45] Oct. 11, 1983

[54] THERMALLY-RESPONSIVE POLYMERIC MATERIALS

[75] Inventors: Denis J. Zalucha, Waterford; Frederick H. Sexsmith, Erie; Dennis D. Howard, Girard, all of Pa.; Michael L. Nulph, Chula Vista, Calif.

[73] Assignee: Lord Corporation, Erie, Pa.

[21] Appl. No.: 326,628

[22] Filed: Dec. 2, 1981

[51] Int. Cl.$^3$ .................... C08G 18/82; C08G 18/48; B32B 17/06

[52] U.S. Cl. .................... 528/499; 428/426; 528/76; 528/904

[58] Field of Search ............ 528/904, 499, 76; 521/905

[56] References Cited

U.S. PATENT DOCUMENTS

| | | | |
|---|---|---|---|
| 3,822,238 | 7/1974 | Blair et al. | 528/904 |
| 3,823,027 | 7/1974 | Wismer et al. | 521/130 |
| 3,854,982 | 12/1974 | Aelion et al. | 204/159.22 |
| 3,939,123 | 2/1976 | Matthews et al. | 528/904 |
| 3,940,542 | 2/1976 | Knopf et al. | 528/904 |
| 3,984,584 | 10/1976 | Brose et al. | 204/159.22 |
| 3,988,272 | 10/1976 | Watts et al. | 523/502 |
| 3,993,798 | 11/1976 | Brose et al. | 525/10 |
| 4,005,244 | 1/1977 | Wismer et al. | 204/159.12 |
| 4,039,414 | 8/1977 | McGinniss | 204/181 E |
| 4,072,592 | 2/1978 | Due et al. | 204/159.15 |
| 4,075,366 | 2/1978 | Packer et al. | 204/159.14 |
| 4,118,366 | 10/1978 | Brose et al. | 204/159.12 |
| 4,133,723 | 1/1979 | Howard | 204/159.15 |
| 4,170,583 | 10/1979 | Itoh et al. | 524/599 |
| 4,182,827 | 1/1980 | Jones et al. | 521/905 |
| 4,187,364 | 2/1980 | Darms et al. | 526/259 |
| 4,206,980 | 6/1980 | Krueger et al. | 350/359 |
| 4,209,605 | 6/1980 | Hoy et al. | 528/904 |
| 4,215,168 | 7/1980 | Yonemura et al. | 428/215 |
| 4,359,558 | 11/1982 | Gould et al. | 528/904 |

OTHER PUBLICATIONS

JPOS, vol. 64, No. 7, (Jul. 1982), pp. 392–414.

*Primary Examiner*—H. S. Cockeram
*Attorney, Agent, or Firm*—John A. Gazewood

[57] ABSTRACT

Articles of commerce which are transparent at a first temperature and less transparent at a second temperature which is different from said first temperature and which are capable of reverting to the original state of transparency are obtained by curing compositions containing at least one isocyanate-functional monomeric or polymeric material which may or may not contain hydrophilic centers consisting essentially of ethylene oxide units having the structure $(CH_2CH_2O)_n$, wherein n is at least two. When the isocyanate-functional material does not contain such hydrophilic centers, it must be cured in the presence of at least one monomeric or polymeric material which may or may not be reactive with isocyanate groups but must contain such hydrophilic centers. Thermosensitivity is imparted to the cured products by the presence of water in the cured material.

27 Claims, No Drawings

THERMALLY-RESPONSIVE POLYMERIC MATERIALS

This invention relates to thermally-responsive polymeric materials. More particularly, the invention relates to compositions of matter which, when cured, can undergo reversible changes from a transparent state to translucent or opaque states, and vice versa, in response to changes in temperature.

It is well known to employ free radical polymerizable compositions, that is, compositions comprising at least one polymerizable material selected from the group consisting of monomer, polymer and mixtures thereof, which polymerize through a free radical mechanism, in preparing opaque films. For example, Wismer et al U.S. Pat. No. 3,823,027 disclose the preparation of cured opaque films by exposing a composition comprising at least one actinic light sensitive material and a solvent having a specified solubility with the material and which is present in an amount in the range of 10 to 70 percent by weight of the total composition and which has a boiling point of at least 46° C. to actinic light to cure the composition. The use of free radical polymerizable compositions to prepare opaque films is disclosed also in Broje et al U.S. Pat. No. 3,984,584; Broje et al U.S. Pat. No. 3,993,798; Wismer et al U.S. Pat. No. 4,005,244; and Broje et al U.S. Pat. No. 4,118,366.

The use of free radical polymerizable compositions to prepare transparent coatings is disclosed in Due et al U.S. Pat. No. 4,072,592 and Howard U.S. Pat. No. 4,133,723. Transparent coatings have been prepared from water-based free radical polymerizable compositions, see McGinnis U.S. Pat. No. 4,039,414; Packer et al U.S. Pat. No. 4,075,366; and McCarty U.S. Pat. No. 4,100,047. Aelion et al U.S. Pat. Nos. 3,854,982 and 4,187,364 disclose the use of free radical polymerizable materials to provide transparent coatings which are capable of absorbing moisture. Watts et al U.S. Pat. No. 3,988,272 disclose the use of water-in-oil emulsions containing free radical polymerizable materials to provide transparent coatings which are substantially impermeable to moisture.

Yonemura et al U.S. Pat. No. 4,215,168 disclose laminated multi-layer sheet structures comprising an opaque flexible sheet layer laminated to a transparent thermic ray-reflecting layer bonded to a transparent synthetic resin layer, which are useful for indoor heat insulation.

Itoh et al U.S. Pat. No. 4,170,583 disclose thermosensitive phase-reversible compositions comprising a conjugated diene-maleic acid derivative copolymer having a sulfur-containing organic radical having from 4 to 300 carbon atoms, which are liquid at a low temperature and solid at a high temperature.

Krueger et al U.S. Pat. No. 4,206,980 disclose normally transparent films which can be rendered translucent by stretching and transparent by relaxing the film.

Howard et al U.S. patent application Ser. No. 246,471, filed Mar. 23, 1981, now abandoned, disclose films which undergo a reversible phase change from transparent to translucent or opaque in response to temperature changes. The films are obtained by polymerizing a temperature-sensitive composition comprising at least one olefinically unsaturated polymeric material having an ethylene oxide content in the range from 2 to 80 percent by weight and water. The compositions themselves must have a transition temperature below which they are transparent and above which they are not transparent and must be cured by exposure to actinic or ionizing irradiation at a temperature at or near their transition temperature.

In accordance with the present invention, there are provided compositions which can be cured to provide products which respond to changes in temperature, which response is evidenced by a change in optical clarity from transparent to translucent or opaque and vice versa, in response to changes in temperature of the product, that is, the cured products are thermosensitive.

More particularly, it has been discovered that thermosensitive articles can be prepared from certain organic compositions which are water sensitive and are not per se thermosensitive. The products resulting from the cure of such compositions are capable of forming an association with water such that the articles become thermosensitive, as evidenced by the change in optical clarity in response to changes in temperature of such products. In other words, the transparency of articles of commerce prepared in accordance with the invention can be enhanced by lowering the temperature of the article or reduced by raising the temperature of the article. The invention further provides thermosensitive devices wherein the thermosensitive article is sealed in an airtight fashion by at least one member which is heat conductive and preferably transparent. Currently, preferred thermosensitive devices are those in which the thermosensitive article is sealed between at least two members, at least one of which is heat conductive and at least one of which is transparent. The invention specifically provides processes for making thermosensitive articles.

The present invention is based on the discovery that water can form an association with certain cured organic materials through a mechanism which is currently not understood to provide articles having, as a characteristic feature, a sharply defined temperature range below which the articles are substantially transparent and above which the articles are translucent to opaque. This phenomenon, the ability to undergo a change in response to changes in temperature, which is accompanied by a clearly evident change in optical clarity, is totally reversible so long as the cured article-water association is maintained. Loss of water results in loss of thermosensitivity; however, it can be regained by the simple procedure of recontacting the article with moisture, such as by immersing the article in water. It was also discovered that thermosensitivity can be retained indefinitely if the articles are not exposed directly to the atmosphere but are protected such as by encapsulation with a thermally nonsensitive but heat conducting member or sealed in an airtight fashion between at least two thermally nonsensitive materials, at least one of which is heat conductive. The sealing members are preferably transparent but may be pigmented for aesthetic reasons in instances where optical properties of the thermosensitive article are unimportant.

In accordance with the present invention, it has been found that thermally responsive, that is, thermosensitive, articles can be prepared by a method comprising curing in the presence of or the substantial absence of water, other than atmospheric moisture, a water-sensitive organic composition comprising at least one first organic compound having at least one reactive isocyanate group (moiety), said first organic compound being selected from the group consisting of isocyanate-functional compounds characterized by the presence of ethylene oxide units having the structure $(CH_2CH_2O)_n$, wherein n is in the range from 2 to 450, preferably 4 to 150, and isocyanate-functional compounds which do not contain such ethylene oxide units, such isocyanate-functional compounds being hereafter referred to as ethylene oxide-containing isocyanate-functional compounds and ethylene oxide-free isocyanate-functional compounds, respectively; provided that, (I) when said first organic compound comprises at least one ethylene oxide-containing isocyanate-functional compound, said composition optionally contains at least one material selected from the group consisting of at least one second organic compound characterized by the presence of ethylene oxide units as herein defined and at least one third organic compound which does not contain such ethylene oxide units, including mixtures of such second and third organic compounds, each of such second and third organic compounds individually being selected from the group consisting of organic compounds which are isocyanate reactive, that is, contain at least one active atom as determined by the Zerewitinoff method which is reactive with an isocyanate group, and organic compounds which are not isocyanate reactive; and, (II), when said first organic compound comprises at least one ethylene oxide-free isocyanate-functional compound, such composition must contain at least one second organic compound characterized by the presence of ethylene oxide units as herein defined and optionally can contain at least one third organic compound which does not contain such ethylene oxide units, each of such second and third organic compounds individually being selected from the group consisting of organic compounds which are isocyanate reactive and organic compounds which are not isocyanate reactive, said water-sensitive organic composition optionally containing from 0.1 to 80, preferably 0.5 to 40, percent by weight, based on the total weight of the compositions, of water. In their uncured condition, the water-sensitive compositions of this invention will contain a content of hydrophilic ethylene oxide units in the range from 1 to 80, preferably 2 to 50, percent by weight, based on total weight of such first, second and third organic compounds contained therein, the balance of such water-sensitive organic compositions comprising units which are hydrophobic or at least less hydrophilic than said ethylene oxide units. In those embodiments wherein the water-sensitive compositions are substantially water-free, the cured solid product is contacted with liquid water or water vapor in an amount and for a time sufficient for such water to be taken up by such solid product in an amount sufficient to induce thermosensitivity. Thermosensitivity can be induced with a water takeup of as little as 0.5 percent by weight, based on ethylene oxide content of the uncured compositions. The amount of water taken up by the cured product inversely affects the transition temperature, that is, the temperature at which the phase change occurs, with the transition temperature decreasing as the water takeup increases. In most cases, it is preferred that the water takeup be on the order of at least 2 percent by weight, with a water takeup in the range from 20 to 70 percent by weight being currently preferred. In those embodiments wherein the uncured compositions contain water, it is generally not necessary to otherwise contact the cured products with moisture, since curing of such water-containing compositions typically provide cured products having an amount of water in association therewith which is sufficient for thermosensitivity. In such cases, it is often advantageous to contact the cured products with additional moisture, especially if it is desired to modify the transition temperature. Some reasonable amount of experimentation will be necessary, especially when products having a specific transition temperature are desired.

It is an essential feature of the present invention that the cured products must be prepared from starting materials which contain either or both ethylene oxide units as herein described and at least one isocyanate-functional moiety or group, it being understood that both entities, that is, the ethylene oxide units and the reactive isocyanate moiety, must be present jointly in a single precursor material or severally in two or more different precursor materials. In other words, one can employ as starting materials substantially any linear or branched saturated or unsaturated acyclic, cyclic or aromatic monomeric or polymeric compound which contains both ethylene oxide units and at least one reactive isocyanate group, or a mixture of such monomeric and polymeric compounds, at least one of which contains ethylene oxide units and at least one of which contains at least one reactive isocyanate group. One can employ also substantially any linear or branched saturated or unsaturated acyclic, cyclic or aromatic monomeric or polymeric compound which contains ethylene oxide units but is substantially inert with respect to any reactive moieties which may be present, such as isocyanate and/or active hydrogen atom-containing groups. It will be readily apparent that the invention contemplates one-component and two-component compositions or systems as these terms are customarily employed in the art of urethane chemistry.

Substantially any linear or branched saturated or unsaturated acyclic, cyclic or aromatic monomeric or polymeric material which is known or can be adapted to be suitable for use in one-component and two-component isocyanate-containing compositions or is reactive with ethylene oxide or its ethoxylated derivatives to form ethylene oxide-containing compounds can be employed in the practice of the invention. In other words, there can be employed in the practice of this invention substantially any linear or branched saturated or unsaturated acyclic, cyclic or aromatic monomeric or polymeric compound containing at least one, preferably at least two, reactive isocyanate groups; substantially any linear or branched saturated or unsaturated acyclic, cyclic or aromatic monomeric or polymeric compound having at least one, preferably at least two, active hydrogen atom(s) which is (are) reactive with isocyanate groups; substantially any linear or branched saturated or unsaturated acyclic, cyclic or aromatic monomeric compound having at least one, preferably two, labile hydrogen atom(s) which is (are) reactive with ethylene oxide or its ethoxylated derivatives; and substantially any linear or branched saturated or unsaturated acyclic, cyclic or aromatic monomeric or polymeric compound containing at least one hydrophilic center consisting essentially of ethylene oxide units having the structure $(CH_2CH_2O)_n$, wherein n is at least 2. Such materials and their preparation are so well-known that no detailed discussion is required.

More particularly, one-component compositions in accordance with this invention typically comprise at least one linear or branched saturated or unsaturated acyclic, cyclic or aromatic monomeric or polymeric compound having at least one reactive isocyanate group, said monomeric or polymeric compound being selected from the group consisting of ethylene oxide-containing and ethylene oxide-free isocyanate-functional compounds, including mixtures thereof; providing, when such composition is substantially free of ethylene oxide-containing isocyanate functional material, said composition must contain at least one linear or branched saturated or unsaturated acyclic, cyclic or aromatic monomeric or polymeric compound which contains ethylene oxide units as herein defined but is not reactive with isocyanate-functional compounds. One-component compositions comprising ethylene oxide-containing isocyanate-functional compounds optionally can have included therein such latterly described ethylene oxide-containing materials which are inert with respect to isocyanate groups. Ethylene oxide-containing polymeric materials having at least two reactive isocyanate groups and ethylene oxide-containing polymeric materials which are inert with respect to isocyanate groups are currently preferred, with the former being especially preferred. As is well known in the art, such one-component systems typically cure upon exposure to liquid water or some other form of moisture to provide linear, branched or crosslinked solid products which are or can be made thermosensitive, depending upon the amount and physical state of the moisture present during the cure cycle.

Two-component compositions in accordance with this invention comprise a first part comprising at least one linear or branched saturated or unsaturated acyclic, cyclic or aromatic monomeric or polymeric compound having at least one reactive isocyanate group selected from the group consisting of ethylene oxide containing and ethylene oxide-free isocyanate-functional compounds, including mixtures thereof; and a second part comprising a curing system for said first part selected from the group consisting of water, at least one linear or branched saturated or unsaturated acyclic, cyclic or aromatic monomeric or polymeric ethylene oxide-containing and ethylene oxide-free compounds having at least one active hydrogen atom which is reactive with isocyanate groups, and isocyanate reaction catalytic agents, including mixtures thereof; providing, when neither the isocyanate-functional component of said first part nor the curing system of said second part contain at least one ethylene oxide-containing compound, either or both of such first and second parts must contain at least one compound which contains ethylene oxide units as herein defined but is otherwise inert with respect to other compounds in such part or parts. These latterly described ethylene oxide-containing compounds which are otherwise inert with respect to other compounds can be optionally employed with ethylene oxide-containing isocyanate-functional compounds and ethylene oxide-containing compounds having at least one active hydrogen atom which is reactive with isocyanate groups. Ethylene oxide-containing polymeric compounds having at least two reactive isocyanate groups, ethylene oxide-containing polymeric compounds having at least two active hydrogen atoms which are reactive with isocyanate groups, ethylene oxide-containing polymeric compounds which are inert with respect to isocyanate groups and ethylene oxide-containing polymeric materials which are inert with respect to active hydrogen atoms which are reactive with isocyanate groups are currently preferred. The individual parts of such two-component systems are kept separate until time of use, and at least the part containing isocyanate-functional material is excluded from contact with moisture until time of use. Upon mixing, the compositions cure through reaction of the isocyanate groups with liquid water or some other form of moisture, or by contact with active hydrogen atom-containing materials, or by catalysis, or by any combination of such means, to provide linear, branched or crosslinked solid products which are or can be made thermosensitive in accordance with the invention, depending on the amount and physical state of the moisture present during the cure cycle.

Monoisocyanate-functional and polyisocyanate-functional compounds are employed in the practice of this invention in formulating both one-component and two-component compositions. It will be immediately recognized that suitable isocyanate functional compounds include substantially all of the monoisocyanates and polyisocyanates which are typically prepared by phosgenation of amines; and also the isocyanate-functional reaction products of at least one polyisocyanate having two or more reactive isocyanate groups with water or at least one linear or branched saturated or unsaturated acyclic, cyclic or aromatic monomeric or polymeric compound having at least one active hydrogen atom which is reactive with isocyanate groups. Such reaction products include simple monomeric and polymeric monoisocyanate-functional and polyisocyanate-functional adducts, as well as more complex compounds, such as monoisocyanate-functional and polyisocyanate-functional polymeric materials, commonly referred to as prepolymers. Suitable isocyanate-functional compounds encompass monomeric and polymeric materials which contain ethylene oxide units as defined herein, as well as such materials which are substantially free of such units. While both monomeric and polymeric monoisocyanate-functional materials can be employed in formulating one-component and two-component compositions in accordance with the invention, it is currently preferred to utilize monomeric and polymeric materials having at least two reactive isocyanate groups per molecule, with polymeric materials, particularly polymeric materials containing ethylene oxide units, being especially preferred. The preferred isocyanate-functional polymeric materials can be prepared by any of the known methods of polyurethane chemistry, either by the one-stage process, or, preferably, by the two-stage or prepolymer process. Both one-stage and two-stage methods of preparing isocyanate-functional polymeric materials may be carried out in the melt or in solution, that is, in the absence or presence of organic solvents which are inert with respect to isocyanate groups. Suitable solvents include methyl formate, ethyl formate, amyl formate, methyl acetate, ethyl acetate, amyl acetate, acetone, methyl ethyl ketone, diethyl ketone, cellosolve acetate, cellosolve butyrate, cellosolve acetate butyrate, benzene, toluene, petroleum naphthas, methylene chloride, dimethylformamide and dioxane. When used, the inert solvents are employed in an amount to provide a solution of isocyanate-functional prepolymer in a concentration in the range from 5 to 75, preferably 5 to 55, percent by weight, expressed as resin solids.

In preparing the preferred isocyanate-functional prepolymers by the one-stage method, the reactants, including at least one polyisocyanate having at least two isocyanate groups, at least one organic compound having at least two active hydrogen atoms and which preferably has a molecular weight in the range from 2000 to 7500 and, optionally, at least one chain-extending organic compound having at least two active hydrogen atoms and which preferably has a molecular weight below 300, are mixed together and reacted simultaneously, employing an isocyanate:total active hydrogen atoms ratio which is preferably in the range from 1.0:1 to 5:1, preferably 1.1:1 to 3.1. The reaction is generally completed in a few hours at reaction temperatures on the order of 50° C., and is facilitated by the use of basic reaction catalysts such as dibutyltin dilaurate. Hydrophilic ethylene oxide centers are readily introduced into isocyanate-functional prepolymers by the use of active hydrogen atom-containing compounds which contain ethylene oxide units in their structure, such as ethylene glycol, diethylene glycol, poly(ethylene oxide) diol, poly(ethylene oxide-propylene oxide) diol copolymer and polyesters obtained by reacting such compounds with one or more polycarboxylic acids or acid anhydrides. The use of difunctional reactants typically provides linear prepolymers and the use of either or both isocyanate compounds and active hydrogen atom-containing compounds having at least three reactive groups typically provides branched copolymers.

In the two-stage process, which is generally preferred, an isocyanate-functional prepolymer is first prepared by reacting excess polyisocyanate with the higher molecular weight active hydrogen atom-containing compounds as described above, preferably at an isocyanate:active hydrogen ratio in the range from 1.05:1 to 5:1, especially 1.1:1 to 2.5:1, using either a solvent-free melt of the reactants or using organic solvents which are inert to isocyanate groups. The resulting prepolymer is then reacted with the lower molecular weight chain-extending organic compound mentioned above, employing an excess amount of prepolymer. Reaction conditions are substantially the same as for one stage processes. Hydrophilic ethylene oxide centers are introduced into isocyanate-functional prepolymers prepared by the two-stage process in the same manner employed in one-stage processes, that is, by the use of active hydrogen atom-containing compounds which contain ethylene oxide units in their structure. Linear products result from the use of difunctional reactants, while branched products result from the use of at least one reactant having three or more reactive groups.

Like isocyanate-functional materials, compounds having at least one active hydrogen atom which is reactive with isocyanate groups are employed in formulating both one-component and two-component compositions in accordance with this invention, with such compounds having two or more active hydrogen atoms being currently preferred. Suitable active hydrogen atom-containing materials include organic compounds which contain ethylene oxide units as herein defined as well as such compounds which are substantially free of such units. Preferred active hydrogen atom-containing compounds are those having hydroxy, carboxyl, mercapto and amino or other nitrogen-containing groups, including combinations of such groups, such as aminohydroxy, with the most preferred compounds being polyhydroxy materials having two or more hydroxy groups, such as polyester polyols, polyacetal polyols, polyamide polyols, polyester polyamide polyols, poly(alkylene oxide) polyols, polylactone polyols, polythioether polyols, hydroxy functional polyurethanes and the like. Monomeric or polymeric compounds having at least one active hydrogen atom, which may or may not contain ethylene oxide units, can be reacted with monomeric or polymeric compounds containing two or more reactive isocyanate groups, which may or may not contain ethylene oxide units, following well-known reaction routes to obtain isocyanate-functional compounds, which may or may not contain ethylene oxide units, for use in one-component compositions or as one part of two-component compositions. Compounds containing at least one active hydrogen atom, which may or may not contain ethylene oxide units, are also employed in accordance with the invention, in the curing systems of two-component compositions. Such compounds can also be employed in the preparation of materials which contain ethylene oxide units, which materials could be isocyanate-functional, could contain active hydrogen atoms which are reactive with isocyanate groups, or are inert with respect to isocyanate groups or active hydrogen atoms.

As is true with both isocyanate-functional compounds and compounds containing at least one active hydrogen atom, monomeric and polymeric compounds which contain ethylene oxide units as herein defined can be employed in formulating both one-component and two-component compositions. Thus, compounds which contain ethylene oxide units and at least one active hydrogen atom can be employed in the preparation of isocyanate-functional ethylene oxide-containing materials for use in one-component compositions and as one part of two-component compositions; in the curing systems of two-component compositions; and in the preparation of compounds which contain ethylene oxide units but which are inert with respect to isocyanate groups or active hydrogen atoms. These latterly described compounds can be employed in one-component compositions in the presence of isocyanate-functional materials which may or may not contain ethylene oxide units; in one part of two-component compositions in the presence of isocyanate-functional materials which may or may not contain ethylene oxide units, and in the curing systems of two-component compositions in the presence or absence of active hydrogen atom-containing compounds which may or may not contain ethylene oxide units.

Ethylene oxide-containing compounds suitable for use in the present invention are readily prepared by well-known methods involving condensation or catalytic polymerization of ethylene oxide or its ethoxylated derivatives. Those skilled in the art will recognize that water and any saturated or unsaturated acyclic, cyclic or aromatic monomeric or polymeric compound having at least one labile hydrogen atom which is reactive with ethylene oxide or its ethoxylated derivatives, including diethylene glycol, can be employed to prepare compounds containing ethylene oxide units as herein defined, including ethylene oxide-containing isocyanate-functional compounds, ethylene oxide-containing compounds which contain no reactive isocyanate groups but which contain active hydrogen atoms which are reactive with isocyanate groups, and ethylene oxide-containing compounds which contain neither reactive isocyanate groups nor active hydrogen atoms. The organic monomeric and polymeric compounds having at least one labile hydrogen atom are preferably those having hydroxyl, carboxyl, mercapto, isocyanato and amino or other nitrogen-containing groups. Currently, water and monomeric and polymeric polyhydroxy compounds are preferred. Compounds containing two or more different labile hydrogen atoms, such as amino and hydroxy, can also be employed in preparing ethylene oxide-containing compounds for use in the practice of the invention. Currently, it is preferred to use the other known oxiranes, water, and organic compounds having at least two labile hydrogen atoms for reaction with ethylene oxide or its ethoxylated derivatives, although the use of compounds having a single labile hydrogen atom can be advantageous, for example, in order to modify crosslink density. Thus, ethylene oxide can be condensed with water or a monomeric organic material containing at least one labile hydrogen atom to form ethylene oxide homopolymers; and with monomeric organic materials containing at least two labile hydrogen atoms or with polymeric organic materials containing at least one labile hydrogen atom to form ethylene oxide-containing polymeric material. Ethylene oxide homopolymers themselves condense with monomeric and polymeric compounds having at least one labile hydrogen atom to form ethylene oxide-containing polymeric materials. For example, ethylene oxide can be condensed in the presence of: (1) water to form poly(ethylene oxide) diol and diethylene glycol; (2) methanol to form the monomethyl ether of poly(ethylene oxide) diol; (3) acrylic acid to form the monoacrylic half-ester of poly(ethylene oxide) diol; (4) acetic acid to form the monoacetate half-ester of poly(ethylene oxide) diol; (5) trimethylolpropane to form poly(ethylene oxide) triol; and (6) poly(propylene oxide) triol to form poly(ethylene oxide-propylene oxide) diol copolyether. Poly(ethylene oxide) diol can be condensed with: (1) monocarboxylic and polycarboxylic acids to form partial esters, full esters and polyesters or poly(ethylene oxide) diol; (2) polyols other than poly(ethylene oxide) polyols to form ethylene oxide-containing polyethers; (3) polyols other than poly(ethylene oxide) polyols and polycarboxylic acids to form ethylene oxide-containing polyesters; and (4) isocyanate-functional monomeric and polymeric materials having at least one reactive isocyanate moiety to form ethylene oxide-containing urethane polymers, including isocyanate-functional and hydroxy-functional urethane polymers. Ethylene oxide and its monomeric or polymeric ethoxylated derivatives can also be condensed in the presence of at least one organic compound having a single labile hydrogen atom to form ethylene oxide-containing monomeric and polymeric materials which are not reactive with compounds containing one or more reactive isocyanate group. This recitation of representative reactions involving ethylene oxide and its monomeric and polymeric ethoxylated derivatives will bring to the mind of the person skilled in the art other reactions and reactants in and with which ethylene oxide and its derivatives can react to form saturated or unsaturated acyclic, cyclic or aromatic monomer or polymeric materials which contain ethylene oxide units as herein defined, including ethylene oxide-containing isocyanate-functional materials, ethylene oxide-containing materials which are reactive with compounds containing at least one isocyanate group, and ethylene oxide-containing materials which contain no reactive isocyanate groups and which do not react with compounds containing isocyanate groups. The use of compounds having no more than two labile hydrogen atoms typically produces linear products; whereas, the use of compounds having at least three labile hydrogen atoms, such as trimethylolpropane, can result in crosslinked products having improved dimensional stability. The reactions of ethylene oxide and its derivatives with compounds containing at least one labile hydrogen atom are well-known and need not be detailed herein.

It will be readily apparent from the discussion, supra, that all of the starting materials, both monomeric and polymeric, including isocyanate functional compounds, active hydrogen atom-containing compounds, ethylene oxide-containing compounds and labile, that is, active hydrogen atom-containing compounds are well known; as are methods for preparing any such starting materials; and, thus, do not require detailed instruction.

Representative materials which can be employed in the formulation of, or in the preparation of materials suitable for use in the formulation of one-component and two-component compositions suitable for use in the present invention include, without being limited thereto, the following monomeric and polymeric substances:

Ethyl isocyanate, phenyl isocyanate, hexyl isocyanate, cyclohexyl isocyanate, toluene diisocyanate, 4,4'-diphenyl diisocyanate, 4,4'-diphenyl-methane diisocyanate, dianisidine diisocyanate, 1,5-naphthalene diisocyanate, 4,4'-diphenyl ether diisocyanate, p-phenylene diisocyanate, trimethylene diisocyanate, octadecylmethylene diisocyanate, 2-chloropropane diisocyanate 3-(dimethyl amine) pentane diisocyanate, trans-vinylene diisocyanate, 4,4'-methylene-bis(phenyl isocyanate), isophorone diisocyanate, 4,4'-methylene-bis(cyclohexyl isocyanate), 4,4',4"-triphenylmethane triisocyanate, 1,3,5-benzene triisocyanate, polymethylene poly(phenyl isocyanate), the adduct of one mole of trimethylolpropane with three moles of 4,4'-methylene-bis(cyclohexyl isocyanate), partially masked isocyanates such as the adducts of equimolar amounts of isophorone diisocyanate with ethyl alcohol, 2-hydroxyethyl acrylate or the monomethyl ether of poly(ethylene oxide) diol, dimeric isocyanates such as the dimers of toluene diisocyanates, and isocyanate-functional prepolymers obtained by reacting an excess of a polyisocyanate having at least two isocyanate groups, such as hexamethylene diisocyanate with compounds having two or more active hydrogen atoms, such as polyamines containing primary and/or secondary amine groups, polythiols having at leat two mercaptan groups, and polyols such as poly(alkylene oxide) polyols, polyesters, polyether-esters, polylactones, polyacetals, alkane polyols and alkene polyols; methanol, ethyl alcohol, acetic acid, acrylic acid, ethyl amine, ethyl mercaptan, ethylene glycol, diethylene glycol, 1,3-propylene glycol, 1,4-butane diol, ethanol amine, ethylene diamine, hexamethylene diamine, n-methyl-diethanol amine, n-cyclohexyl diisopropyl amine, N,N-dihydroxyethyl-p-toluidine, N,N-dihydroxypropylnaphthyl amine, oxalic acid, malonic acid, succinic acid, adipic acid, sebacic acid, maleic acid, fumaric acid, 6-aminocaproic acid, p-aminobenzoic acid, glycerol, trimethylolpropane, erythritol, pentaerythritol, polyethers such as poly(ethylene oxide) diol, poly(propylene oxide) diol, and poly(tetramethylene oxide) diol; polylactones such as polycaprolactone; polycarbonates, polyacetals, polythioethers and polyhydroxypolyesters of polycarboxylic acids such as succinic acid, adipic acid, suberic acid, azelaic acid, sebacic acid, phthalic acid, isophthalic acid, terephthalic acid and tetrahydrophthalic acid with polyols such as ethylene glycol, diethylene glycol, 1,4-butane diol, trimethylolpropane, glycerol, erythritol, pentaerythritol, poly(ethylene oxide) diol, poly(ethylene oxide-propylene oxide) diol and poly(tetramethylene oxide) diol.

In preparing both one-component and two-component compositions for use in the practice of the invention, the use of polymeric materials, at least one of which contains ethylene oxide units, is currently preferred. Thus, one-component compositions preferably comprise at least one ethylene oxide-containing polymeric material having at least two reactive isocyanate groups and, optionally, up to 75 percent by weight, based on total weight of polymeric material of at least one ethylene oxide-containing polymeric material which is inert with respect to isocyanate groups. Alternatively, such one-component compositions can comprise at least one ethylene oxide-free polymeric material having at least two reactive isocyanate groups and up to 75 percent by weight, based on total weight or polymeric material, of at least one ethylene oxide-containing material which is inert with respect to isocyante groups. In embodiments wherein the compositions are handled at elevated temperatures, such as injection molding processes, it is often advantageous to fully mask all isocyanate moieties with blocking agents, such as oxime compounds, and to include in such compositions one or more polymeric materials, including ethylene oxide-containing polymeric materials, having at least two active hydrogen atoms, preferably in an amount 0.8 to 1.1 equivalents of masked isocyanate compound per equivalent of active hydrogen atom-containing compound. Such compositions containing masked isocyanate-containing compounds can have optionally included therein one or more ethylene oxide-containing polymeric materials which are inert with respect to both isocyanate groups and active hydrogen atoms, in an amount of up to 75 percent by weight, based on total weight of polymeric material.

The isocyanate-containing part of two-component compositions preferably comprise at least one ethylene oxide-containing polymeric material having at least two reactive isocyanate groups. In this most preferred embodiment, the isocyanate-containing part can optionally contain up to 75 percent by weight, based on total weight of polymeric material present in such part of at least one ethylene oxide-containing polymeric material which is inert with respect to isocyanate groups; with the second part preferably containing at least one polymeric material having at least two active hydrogen atoms. In such especially preferred embodiments, the second part comprising the curing system can optionally include at least one isocyanate reaction catalytic agent or water or a mixture of such catalytic agents or water. Should water be utilized in the curing system, it is preferred that the active hydrogen atom-containing compound include at least one material which has a more rapid rate of reaction with isocyanate groups than does water, to inhibit foaming. The active hydrogen atom-containing compounds employed in two-component compositions wherein the isocyanate-functional compounds contain ethylene oxide units may or may not themselves contain ethylene oxide units and the use in such compositions of ethylene oxide-containing compounds which are inert with respect to either or both isocyanate groups or active hydrogen atoms in either the part containing isocyanate-functional compound or the part containing curing system is optional, providing the isocyanate-functional material contains ethylene oxide units within the stipulated range. In the case of two-component compositions wherein the isocyanate-functional compound is essentially free of ethylene oxide units, the desired hydrophilic level can be provided by any or all of active hydrogen atom-containing compounds or compounds which are inert with respect to either or both isocyanate groups and active hydrogen atoms. With respect to such two-component compositions, the isocyanate-functional compounds and the active hydrogen atom-containing compounds are employed in a range of 0.8 to 1.1 equivalents of isocyanate-containing compounds per equivalent of active hydrogen atom-containing materials. When employed, ethylene oxide-containing polymeric materials which are inert with respect to either or both isocyanate groups and active hydrogen atoms should not exceed more than 75 percent by weight, based on total weight of polymeric material present, of the individual part in which they may be employed. In cases where the curing system of two-component compositions is substantially free of active hydrogen atom-containing materials, the desired hydrophilic level can be provided by any or all of isocyanate-functional compounds or compounds which are inert with respect to either or both isocyanate groups and active hydrogen atoms. As is the case with one-component compositions, the use of fully-masked isocyanates can be advantageous. The isocyanate-functional compounds preferably have an isocyanate content of at least 1.0, especially 2.5 to 8.0, percent by weight.

As indicated, supra, curing of both one-component and two-component compositions can result in linear, branched or crosslinked products. For example, the use of starting materials which have no more than two functional groups typically provide linear products. To obtain branched or crosslinked products, there is employed at least one material having at least three functional groups selected from the group consisting of ethylene oxide-containing and ethylene oxide-free isocyanate-functional compounds, ethylene oxide-containing and ethylene oxide-free active hydrogen atom-functional compounds and labile hydrogen atom-containing compounds, including mixtures of such compounds. Branching and crosslinking improve dimensional stability of the cured products; however, crosslink density can negatively affect thermosensitivity; that is, an increase in crosslink density is accompanied by a decrease in thermosensitivity and can result in substantially complete loss of thermosensitivity if the product is too tightly crosslinked. In the general case, the crosslink density should be no greater than one crosslink per 1,000 units of molecular weight, and is preferably no greater than one crosslink per 10,000, more preferably per 50,000, units of molecular weight. An intriguing means of obtaining improvements in dimensional stability while maintaining crosslink density within resonable levels is to employ a starting material having at least three functional groups and to cap at least one, but not all, of the reactive functional groups in excess of two with a capping agent which is monofunctional with the reactive functional group (isocyanate or active hydrogen atom) but otherwise substantially inert. This procedure provides for some degree of branching as well as crosslinking to take place. One can thus anticipate that the resulting chain entanglement will provide improved dimensional stability at lower ranges of crosslink density.

Both one-component and two-component systems are produced by conventional methods by mixing the selected components together, utilizing any known blending technique. Because isocyanate groups are highly reactive to water, both the one-component compositions and the isocyanate-containing part of two-component systems should be excluded from contact with moisture prior to use. Both one-component and two-component compositions are usable at total resin solids contents in the range from 5 to 100 percent by weight. When used, the diluents are preferably inert organic solvents of the types discussed above, with non-aromatic solvents being currently preferred. The compositions can be applied directly to flexible and solid substrates in a conventional manner, as by spraying, dipping, brushing and rolling or formed into an appropriate shape, as by extrusion, molding or casting.

The compositions are conventionally cured by exposure to moisture, by reaction between isocyanate groups and active hydrogen atoms, by catalysis, or any combination of such means. Subsequent to the completion of the curing cycle, the cured solid product is contacted with water, as by immersion, for a time sufficient for the product to take-up a sufficient amount of water to render the product thermosensitive. It will be appreciated that by appropriate selection of cure conditions, it should be possible to have water present during the cure, thus eliminating the need to add the water later. An example would be a mixture of polyfunctional isocyanate, a polyfunctional amine and water where the amine and isocyanate react rapidly to give polyurea before the water-isocyanate reaction can produce a significant amount of carbon dioxide. The nature of the reactions of the functional groups to give a solid product does not appear as important as is the creation of a network structure which is not so rigid as to immobilize the hydrophilic and hydrophobic centers of the product and prevent the uptake of sufficient water to induce thermosensitivity.

The cured water-containing products of this invention can be employed in a variety of applications, especially those where radiant heat loss or build-up or undesirable light transmission through glass or transparent plastic exists. Thus, the products can be employed in greenhouses, office buildings, factories, schools and homes where regulation of heat and light transmission is desirable.

A preferred embodiment of this invention comprises a double-paned window with the cured water-containing product sandwiched between the glass panels or other optically clear material, such as plastic, e.g., polycarbonate, poly(methyl methacrylate) or poly(ethylene terephthalate). The optically clear panels are supported by conventional frame members. According to this embodiment, either a one-component or two-component composition prepared in accordance with this invention is cast onto one side of the panel, permitted to cure and immersed in water. The excess water is removed, the second panel is placed over the cured product and the edges are sealed in an airtight fashion, as by adhesion or rubber gasketing. The resultant assembly is fitted into the frame member to afford a window which is transmissive to radiant energy at a first temperature and is less transmissive to radiant energy at a second temperature higher than said first temperature due to a decrease in light transmissibility and which is capable of reverting to its original light and heat transmissibility when the temperature is adjusted to the first temperature level.

The following examples will serve to illustrate the invention.

EXAMPLE I

Into a glass reactor vessel were placed 45.8 g (0.046 moles) of a propylene oxide-ethylene oxide triblock copolymer diol containing about 40 weight percent ethylene oxide units attached to the central propylene oxide block (OI in 55-112), 24.2 g (0.092 moles) of 4,4'-methylenebis (cyclohexyl isocyanate), 30 g toluene and 0.2 g dibutyltin dilaurate. The mixture was heated to 70° C. under nitrogen and held at that temperature for 2 hours. The resulting prepolymer solution was 3.88 wt. percent—NCO, that is, the prepolymer was 5.54 percent—NCO.

The prepolymer solution was used to make a polymeric film by casting a 50 ml thick film of the solution onto an aluminum panel. This was left exposed to the laboratory atmosphere for 16 hours then baked 4 hours at 70° C. The resulting self-supporting film was dry, tack-free, colorless and transparent, having cured by reaction with the moisture in the ambient atmosphere.

Samples were cut from the film and allowed to imbibe water by soaking each in water at a controlled temperature for 24 hours after which they were found to have absorbed an amount of water sufficient to exhibit a reversible transition from transparent to opaque as the film was heated. The data demonstrate that the transition temperature is a function of the water temperature, as well as the necessity for the presence of water in the cured film.

| Sample No. | Soak Temp. | Transition Temp. |
|---|---|---|
| 1 | 2° C. | 5° C. |
| 2 | 22° C. | 41° C. |
| 3 | 41° C. | 45° C. |
| Control | No Soak | None (remains clear) |

EXAMPLE II

As an alternative to curing by reaction with atmospheric moisture, the prepolymer from Example I was cured by reaction with 1,4 butanediol. 48.1 g of prepolymer was combined with 1.87 g 1,4 butanediol and 0.2 g dibutyltin dilaurate. A 50 mil thick film was cast on an aluminum panel and allowed to dry for 4 hours under ambient laboratory conditions, then baked at 50° C. overnight to give a self-supporting, dry, tack-free, colorless, transparent film. Samples were soaked in water at various controlled temperatures to give films exhibiting a reversible transition from transparent to opaque as the film is heated.

| Sample No. | Soak Temp. | Transition Temp. |
|---|---|---|
| 1 | 2° C. | 15° C. |
| 2 | 22° C. | 26° C. |
| 3 | 41° C. | 40° C. |
| Control | No Soak | None (remains clear) |

EXAMPLE III

The ingredients as listed in Table I are mixed thoroughly to form a homogeneous liquid composition, to which is added 0.1 percent by weight dibutyltin dilaurate urethanation catalyst. The viscous solution is drawn down onto aluminum panels to provide films having a 10 mil wet thickness. The films are cured by baking at 100° C. for 30 minutes at ambient humidity conditions. After cooling to room temperature, the cured films, which are dry, tack-free, colorless and transparent, are immersed in a water bath at the temperatures indicated in the Table and the time required for them to take-up sufficient water at the indicated temperature to undergo a phase change from transparent to opaque upon heating was observed. The results are reported in Table I.

TABLE I

| Ingredient | Formulation | | | | |
|---|---|---|---|---|---|
| | 1 | 2 | 3 | 4 | 5 |
| 4,4'-Methylene-bis (cyclo-hexyl isocyanate) | 20.64 | 20.45 | 19.01 | 17.80 | 2.71 |
| 1,6-Hexamethylene diisocyanate biuret, 4 NCO functionality | 0.25 | 0.50 | 2.52 | 4.19 | 25.17 |
| Poly(ethylene oxide-propylene oxide) diol, 650 MW | 7.60 | 7.40 | 5.79 | 4.45 | 0.51 |
| Poly(ethylene oxide-propylene oxide) diol, 1000 MW | 41.52 | 41.65 | 42.69 | 43.56 | 41.61 |
| $E_c$* | 100,000 | 50,000 | 10,000 | 6,000 | 1,000 |
| NCO:OH | 1.1 | 1.1 | 1.1 | 1.1 | 1.1 |
| Percent Nitrogen | 3.18 | 3.18 | 3.18 | 3.18 | 3.18 |
| Minimum soak time to become thermotropic | <30 sec | <30 sec | 5 min | 24 hrs. | >7 days |

*Crosslink density, equivalent weight/crosslink, calc.

The data show the effect of crosslink density on thermosensitivity, i.e., thermotropic behavior, and demonstrate the capacity of properly prepared cured materials to become thermosensitive upon exposure to moisture if crosslink density is not excessive.

EXAMPLE IV

Films are prepared from the formulations as listed in Table II, following the preparatory procedure of Example III. The cured films, which are dry, tack-free, colorless and transparent, are immersed in water to determine their capability of becoming thermosensitive. The results are reported in Table II, and are self-explanatory.

TABLE II

| Ingredient | Formulation | | | | |
|---|---|---|---|---|---|
| | 1 | 2 | 3 | 4 | 5 |
| 4,4'-Methylene-bis(cyclohexyl isocyanate) | 20.45 | 20.45 | 20.45 | 20.45 | 20.45 |
| Hexamethylene diisocyanate biuret, 4 NCO functionality | 0.50 | 0.50 | 0.50 | 0.50 | 0.50 |
| Poly(ethylene oxide) diol, 200 MW | 5.64 | 3.73 | — | — | — |
| Poly(ethylene diol, 400 MW | 11.20 | 7.46 | 4.50 | 6.70 | 14.00 |
| Poly(ethylene oxide) diol, 600 MW | — | — | 6.70 | 10.10 | — |
| Poly(propylene oxide) diol, 700 MW | — | — | 37.76 | 19.85 | 6.26 |
| Poly(propylene oxide) diol, 1000 MW | — | 31.46 | 0.08 | 12.39 | 28.79 |
| Poly(propylene oxide) diol, 2000 MW | 32.24 | 6.38 | — | — | — |
| $E_c$, calc. | 50,000 | 50,000 | 50,000 | 50,000 | 50,000 |
| NCO:OH | 1.1 | 1.1 | 1.1 | 1.1 | 1.1 |
| Percent Nitrogen | 3.18 | 3.18 | 3.18 | 3.18 | 3.18 |
| Percent Poly(ethylene oxide)diol | 24.0 | 16.0 | 16.0 | 24.0 | 20.0 |
| Poly(ethylene oxide) diol, avg. MW | 300 | 300 | 500 | 500 | 400 |
| Observations | All formulations became thermosensitive when soaked in water. | | | | |

EXAMPLE V

Following the procedure of Examples III and IV, films are prepared from the formulations as set forth in Table III. The cured films, which are dry, tack-free, colorless and transparent, are immersed in water to determine their capability of becoming thermosensitive.

The results, which are self-explanatory, are reported in Table III.

TABLE III

| Ingredient | Formulation | | | |
|---|---|---|---|---|
| | 1 | 2 | 3 | 4 |
| 4,4'-methylene-bis (cyclohexyl isocyanate) | 20.45 | 20.45 | 20.45 | 20.45 |
| Hexamethylene diisocyanate biuret, 4 NCO functionality | 0.50 | 0.50 | 0.50 | 0.50 |
| Poly(ethylene oxide) diol, 400 MW | 14.00 | 14.00 | 14.00 | — |
| Poly(ethylene oxide) diol, 1000 MW | — | — | — | 14.00 |
| Poly(tetramethylene oxide) diol, 650 MW | 5.07 | — | — | — |
| Poly(tetramethylene oxide) diol, 1000 MW | 29.97 | — | — | — |
| Hexane diol-phthalic acid polyester, 210 hydroxyl No. | — | 1.84 | — | — |
| Hexane diol-phthalic acid polyester, 115 hydroxyl No. | — | 33.20 | — | — |
| Polycaprolactone diol, 850 MW | — | — | 20.32 | — |
| Polycaprolactone diol, 1500 MW | — | — | 14.72 | — |
| Poly(propylene oxide) diol, 400 MW | — | — | — | 12.63 |
| Poly(propylene oxide) diol, 700 MW | — | — | — | 22.41 |
| $E_c$, calc. | 50,000 | 50,000 | 50,000 | 50,000 |
| NCO:OH | 1.1 | 1.1 | 1.1 | 1.1 |
| Percent Nitrogen | 3.18 | 3.18 | 3.18 | 3.18 |
| Percent Poly(ethylene oxide) diol | 20.0 | 20.0 | 20.0 | 20.0 |
| Observations | All formulations become thermosensitive when heated. | | | |

EXAMPLE VI

Films are prepared, cured and evaluated according to the procedure of Example III from the formulations detailed in Table IV. The cured films, prior to immersion, are dry, tack-free, colorless and transparent. The results, which are self-explanatory, are reported in the Table.

TABLE IV

| Ingredient | Formulation | | |
|---|---|---|---|
| | 1 | 2 | 3 |
| 4,4'-methylene-bis (cyclohexyl isocyanate) | 20.45 | 19.01 | 11.77 |
| Hexamethylene diisocyanate biuret, average NCO functionality of 4 | 0.50 | 2.52 | 12.58 |
| Poly(ethylene oxide) diol, 600 MW | 14.00 | 14.00 | 14.00 |
| Poly(propylene oxide) diol, 400 MW | 2.86 | 3.64 | 4.24 |
| Poly(propylene oxide) diol, 700 MW | 32.18 | 30.84 | 27.41 |

TABLE IV-continued

| Ingredient | Formulation 1 | Formulation 2 | Formulation 3 |
|---|---|---|---|
| $E_c$, calc. | 50,000 | 10,000 | 2,000 |
| NCO:OH | 1.1 | 1.1 | 1.1 |
| Percent Nitrogen | 3.18 | 3.18 | 3.18 |
| Percent Poly(ethylene oxide) diol | 20.0 | 20.0 | 20.0 |
| Minimum soak time to become thermotropic | 5 min. | 4 hrs. | >7 days |

EXAMPLE VII

Films are prepared, cured and evaluated according to the procedure of Example III from the formulations detailed in Table V. The cured films, prior to immersion, are dry, tack-free, colorless and transparent. The results, which are self-explanatory, are reported in the Table.

TABLE V

| Ingredient | Formulation 1 | Formulation 2 | Formulation 3 | Formulation 4 |
|---|---|---|---|---|
| 4,4'-methylene-bis(cyclohexyl isocyanate) | 20.45 | 20.45 | 20.45 | 20.45 |
| Hexamethylene diisocyanate biuret, average NCO functionality of 4 | 0.50 | 0.50 | 0.50 | 0.50 |
| Poly(ethylene oxide) diol, 600 MW | — | 7.00 | 14.00 | 28.00 |
| Poly(propylene oxide) diol, 400 MW | 7.97 | 5.42 | 2.86 | — |
| Poly(propylene oxide) diol, 700 MW | 41.07 | 36.63 | 32.18 | 14.09 |
| Poly(propylene oxide) diol, 1000 MW | — | — | — | 6.95 |
| $E_c$, calc. | 50,000 | 50,000 | 50,000 | 50,000 |
| NCO:OH | 1.1 | 1.1 | 1.1 | 1.1 |
| Percent Nitrogen | 3.18 | 3.18 | 3.18 | 3.18 |
| Observations | \multicolumn{4}{l}{Formulations 2, 3 and 4 became thermosensitive after water soak, while Formulation 1, containing no poly(ethylene oxide) segments, was not noticeably thermosensitive following the water soak.} |

EXAMPLE VIII

A polyurethane, identified as CEO-1, is prepared by reacting 1.0 mol poly(ethylene oxide) diol having a 1000 MW with 3 mols of 4,4'-methylene-bis(cyclohexyl isocyanate) in the presence of 4 mols 2-hydroxy-ethyl acrylate. The resulting acrylated polyurethane is substantially inert with respect to isocyanate groups and active hydrogen atoms.

The thus prepared polyurethane is employed to prepare formulations according to the schedule of Table VI. The ingredients are mixed to form homogeneous liquid solutions, which are drawn down on aluminum panels to provide films having a 30 mil wet film thickness. The films are cured by heating at 55° C. for one hour at ambient humidity conditions. After cooling to room temperature, the cured films, which are dry, tack-free, colorless and transparent, are immersed in a room temperature water bath for two hours. The average water pickup is CA 2 percent by weight. Films prepared from formulations 1 and 2 undergo a phase change from transparent to opaque upon heating, but films prepared from formulation 3, which contains no isophorone diisocyanate, are not noticeably thermosensitive, indicative of an excessive crosslink density.

TABLE VI

| Ingredient | Formulation 1 | Formulation 2 | Formulation 3 |
|---|---|---|---|
| CEO-1 | 20 | 20 | 20 |
| Polycaprolactone diol, 540 MW | 25 | 25 | 25 |
| Isophorone diisocyanate | 7.6 | 15.3 | — |
| Hexamethylene diisocyanate biuret | 13.5 | — | 27 |
| Dibutyltin dilaurate | 0.1 | 0.1 | 0.1 |

EXAMPLE IX 96.2 g of the prepolymer of Example I was mixed with 3.74 g 1,4-butane diol and 0.4 g dibutyltin dilaurate. A film of approximately 30 mils thickness of the formulation was applied to one side of several optically-clear poly(ethylene terephthalate) panels (6"×6") having a thickness of 10 mils, using a wire-wound drawdown bar. In all cases, the films are allowed to dry for 4 hours under ambient laboratory conditions, then baked at 50° C. to give a dry, tack-free, colorless transparent film. One-half of the coated panels were soaked in water at 22° C. for 24 hours, while the remainder of the panels were exposed only to ambient laboratory conditions. Following the 24-hour conditioning period, a second identical panel is placed over the conditioned film and the edges are sealed with rubber gasketing. Similar laminated structures were prepared, employing as optically clear materials glass, poly(methyl methacrylate) and polycarbonate. In all instances, the laminates made from the water-soaked films exhibit a reversible transition from transparent to opaque at a transition temperature of 26° C. when the laminates were placed in a water bath which was cycled between 20° C. and 40° C. four times per day. In all instances, the laminates made from the films which were not water-soaked did not show any noticeable response to temperature changes even when the water bath is heated to 100° C., indicative that the water pick-up under ambient conditions was insufficient to induce thermosensitive properties.

What is claimed is:

1. A polymeric material which is transparent at a first temperature and less transparent at a second temperature, said second temperature being different from and higher than said first temperature, said polymeric material being capable of returning to its more transparent state when its temperature is adjusted to said first temperature, said polymeric material comprising the reaction product obtained by curing in the presence of moisture at least one first organic compound, said first organic compound being selected from the group consisting of linear or branched saturated or unsaturated acyclic, cyclic or aromatic monomeric or polymeric compounds characterized by the presence of at least one reactive isocyanate group, such isocyanate group-containing compound being selected from the group consisting of such compounds which contain at least one hydrophilic center consisting essentially of ethylene oxide units having the structure $(CH_2CH_2O)_n$, wherein n is at least 2, such compounds which do not contain such hydrophilic centers, and mixtures thereof; providing that, when said reactive isocyanate group-containing compound does not contain such hydrophilic centers, said compound is cured in the presence of at least one second compound characterized by the presence of at least one hydrophilic center consisting essentially of ethylene oxide units having the structure $(CH_2CH_2O)_n$, wherein n is as previously defined, said reaction product containing at least 2 percent by weight water.

2. A polymeric material according to claim 1 wherein said isocyanate group-containing compound comprises at least one isocyanate-functional polymeric compound having at least two isocyanate groups.

3. A polymeric material according to claim 2 wherein said isocyanate-functional polymeric compound is characterized by the presence of at least one hydrophilic center consisting essentially of ethylene oxide units having the structure $(CH_2CH_2O)_n$, wherein n is at least 2.

4. A polymeric material according to claim 1 wherein said isocyanate group-containing compound is cured in the presence of at least one compound containing at least one active hydrogen atom.

5. A polymeric material according to claim 4 wherein said isocyanate group-containing compound contains at least one hydrophilic center consisting essentially of ethylene oxide units as previously defined.

6. A polymeric material according to claim 4 wherein said compound containing at least one active hydrogen atom contains at least one hydrophilic center consisting essentially of ethylene oxide units as previously defined.

7. A polymeric material according to claim 6 wherein said isocyanate group-containing compound contains at least one hydrophilic center consisting essentially of ethylene oxide units as previously defined.

8. A polymeric material according to claim 1 wherein said isocyanate group-containing compound is cured in the presence of at least one compound having at least one hydrophilic center consisting essentially of ethylene oxide units as previously defined and which is inert with respect to isocyanate groups.

9. A polymeric material according to claim 1 wherein said isocyanate group-containing compound is cured in the presence of, (1) at least one compound having at least one active hydrogen atom and, (2) at least one compound having at least one hydrophilic center consisting essentially of ethylene oxide units as previously defined and which is inert with respect to isocyanate groups and active hydrogen atoms.

10. A polymeric material according to claim 7 wherein each of said isocyanate group-containing compound and said compound having at least one active hydrogen atom is characterized by the substantial absence of hydrophilic centers as previously defined.

11. A method for the preparation of polymeric materials which are transparent at a first temperature and less transparent at a second temperature which is different from and higher than said first temperature, said polymeric materials being capable of reverting to the more transparent state when the temperature is adjusted to said first temperature, said method comprising curing in the presence of moisture at least one first organic compound having at least one reactive isocyanate group to form a cured polymeric material, said isocyanate group containing compound being selected from the group consisting of, (1) such compounds having at least one hydrophilic center consisting essentially of ethylene oxide units having the structure $(CH_2CH_2O)_n$, wherein n is at least 2, (2) such compounds which do not contain such hydrophilic centers, and (3) mixtures of such compounds (1) and (2); providing that, when said first compound does not contain such hydrophilic centers, such first compound is cured in the presence of at least one second compound which is characterized by the presence of at least one hydrophilic center consisting essentially of ethylene oxide units as previously defined, and contacting said cured polymeric material with moisture subsequent to its cure in an amount and for a time sufficient for said polymeric material to take up at least two percent by weight of moisture.

12. A method according to claim 11 wherein said first organic compound comprises at least one isocyanate-functional polymeric compound having at least two isocyanate groups.

13. A method according to claim 12 wherein said isocyanate-functional polymeric compound has at least one hydrophilic center consisting essentially of ethylene oxide units as previously defined.

14. A method according to claim 11 wherein said isocyanate group containing compound is cured in the presence of at least one compound having at least one active hydrogen atom selected from the group consisting of (i) such compounds containing at least one hydrophilic center consisting essentially of ethylene oxide units as previously defined, (ii) such compounds which do not contain such hydrophilic centers, and (iii) mixtures of such compounds (i) and (ii).

15. A method according to claim 14 wherein said first organic compound comprises at least one isocyanate-functional polymeric compound having at least two isocyanate groups and at least one hydrophilic center consisting essentially of ethylene oxide units as previously defined.

16. A method according to claim 15 wherein said compound having at least one active hydrogen atom has at least one hydrophilic center consisting essentially of ethylene oxide units as previously defined.

17. A method according to claim 14 wherein said compound having at least one active hydrogen atom has at least one hydrophilic center consisting essentially of ethylene oxide units as previously defined.

18. A method according to claim 17 wherein said isocyanate group-containing compound is substantially free of ethylene oxide units as previously defined.

19. A method according to claim 11 wherein said isocyanate group-containing compound is cured in the presence of at least one compound having at least one hydrophilic center consisting essentially of ethylene oxide units as previously defined and which is inert with respect to isocyanate groups.

20. A method according to claim 19 wherein said isocyanate group-containing compound is substantially free of ethylene oxide units as previously defined.

21. A method according to claim 19 wherein said isocyanate group-containing compound has at least one hydrophilic center as previously defined.

22. A method according to claim 21 wherein said isocyanate group-containing compound is cured in the presence of at least one compound having at least one active hydrogen atom and which is substantially free of hydrophilic centers as previously defined.

23. A method according to claim 20 wherein said isocyanate group-containing compound is cured in the presence of at least one compound having at least one active hydrogen atom and which has at least one hydrophilic center as previously defined.

24. A method according to claim 11 wherein said isocyanate group-containing compound is cured in the presence of, (1) at least one compound having at least one active hydrogen atom, and (2) at least one compound having at least one hydrophilic center consisting essentially of ethylene oxide units as previously defined and which is inert with respect to isocyanate groups and active hydrogen atoms.

25. A method according to claim 24 wherein each of said isocyanate group-containing compound and said compound having at least one active hydrogen atom is characterized by the substantial absence of hydrophilic centers as previously defined.

26. A method according to claim 24 wherein each of said isocyanate group-containing compound and said compound having at least one active hydrogen atom has at least one hydrophilic center as previously defined.

27. A method according to claim 12 wherein said cure is effected in the presence of a curing system selected from the group consisting of at least one compound having at least one active hydrogen atom, at least one urethanation catalyst, and mixtures thereof.

* * * * *